United States Patent [19]
Koning

[11] Patent Number: 5,904,371
[45] Date of Patent: May 18, 1999

[54] ENERGY MANAGEMENT SAFETY BELT RETRACTOR WITH MODE SHIFTING MECHANISM

[75] Inventor: Richard W. Koning, Yale, Mich.

[73] Assignee: Breed Automotive Technology, Inc., Lakeland, Fla.

[21] Appl. No.: 09/026,108

[22] Filed: Feb. 19, 1998

[51] Int. Cl.⁶ .................................................... B60R 22/36
[52] U.S. Cl. ........................................... 280/806; 280/807
[58] Field of Search ..................................... 280/806, 807

[56] References Cited

U.S. PATENT DOCUMENTS

| | | | |
|---|---|---|---|
| 4,991,874 | 2/1991 | Tsuge et al. | 280/806 |
| 5,072,968 | 12/1991 | Hamaue | 280/806 |
| 5,333,906 | 8/1994 | Jujimura et al. | 280/806 |
| 5,441,304 | 8/1995 | Zygutis et al. | 280/806 |
| 5,568,941 | 10/1996 | Woydick et al. | 280/806 |

*Primary Examiner*—Kenneth R. Rice
*Attorney, Agent, or Firm*—Markell Seitzman

[57] ABSTRACT

A safety belt retractor (10) having an energy management mechanism (12) capable of transferring a portion of the impact energy to the retractor (10) during one or more collisions and a mode shift mechanism (18) capable of determining the severity of the collision(s) as a function of the amount of energy absorbed by the energy management mechanism (12). In addition, the mode shift mechanism (18) is capable of disabling the retractor (10) following retraction of the belt (40) to its stowed position when the amount of energy absorbed by the energy management mechanism (12) exceeds a maximum allowable limit.

15 Claims, 9 Drawing Sheets

ENERGY MANAGEMENT SAFETY BELT RETRACTOR WITH MODE SHIFTING MECHANISM

BACKGROUND AND SUMMARY OF THE INVENTION

The present invention relates generally to safety restraint systems for motor vehicles. More specifically, the present invention is directed to a safety belt retractor having an energy management mechanism capable of transferring energy to the retractor during a collision and a mode shifting mechanism capable of subsequently disabling the retractor when the amount of energy absorbed by the energy management mechanism exceeds a maximum allowable limit.

As part of the occupant restraint system currently used in motor vehicles, several different types of safety belt retractors are available which provide enhanced occupant comfort and/or different functional modes. For example, one type of safety belt retractor, often referred to as an emergency locking retractor (ELR), includes a latch mechanism which is automatically actuated in response to certain high acceleration conditions to prevent payout of the safety belt. Typically the latch mechanism is actuated by an inertia-sensitive actuator when the vehicle is subjected to a certain deceleration level and/or actuated by a web-sensitive actuator when the belt is withdrawn from the spool at a rate exceeding a designated level. Another type of safety belt retractor, commonly referred to as an automatic locking retractor (ALR), includes a latch mechanism which is selectively actuated by withdrawing a predetermined length of the safety belt. Once the predetermined length of the safety belt has been withdrawn, the latch mechanism allows retraction but prevents further payout of the safety belt. Thereafter, this automatic locking function is canceled in response to the retraction of a predetermined amount of the safety belt to its stowed position. As a further variation, some dual-mode safety belt retractors normally operate as an ELR retractor and can be selectively switch to operate as an ALR retractor such as, for example, when it is desired to secure a portable child seat to the vehicle seat. These retractors are often referred to as ELR/ALR retractors.

These different safety belt retractors may also include an energy management mechanism which functions to absorb a portion of the energy (i.e. impact loads) transferred from the safety belt to the seat occupant during a collision. For example, some energy management retractors include a torsion bar having a first end fixed to the spool. During a collision, the latch mechanism engages the second end of the torsion bar. As such, the impact force applied by the seat occupant to the safety belt is transferred to the spool and causes the torsion bar to twist relative to the latched second end. Such torsional yielding of the torsion bar results in a limited though controlled amount of additional rotation of the spool which, in turn, permits a corresponding amount of additional belt to be withdrawn from the retractor. The controlled payout of additional belt in response to loading on the safety belt effectively dampens the amount of impact energy transferred to the seat occupant and controls the forward motion of the occupant. The physical dimensions and material characteristics of the torsion bar are selected to define its yield rate and permit it to rotate a predetermined number of turns. More specifically, this predetermined number of turns is selected to be greater than that required for the torsion bar to survive a single severe collision or the cumulative effect of a number of less severe collisions.

An object of the present invention is to provide a safety belt retractor having an energy management mechanism capable of transferring a portion of the impact energy to the retractor during one or more collisions and a mode shifting mechanism capable of determining the severity of the collision(s) as a function of the amount of energy absorbed by the energy management mechanism.

Another object of the present invention is to provide the mode shifting mechanism with the capability to disable the safety belt retractor when the amount of energy absorbed by the energy management mechanism exceeds a maximum allowable limit.

A further object of the present invention is to integrate the mode shifting mechanism into the automatic locking mechanism of an emergency locking retractor.

Accordingly, the present invention is directed to a safety belt retractor comprising a spool, a belt wound on the spool, a ratchet wheel, and an emergency locking mechanism normally operable in a released mode to permit payout and retraction of the belt and which is automatically shifted into a locked mode for locking the ratchet wheel against rotation to prevent payout of the belt in response to the occurrence of a predetermined acceleration condition. The safety belt retractor also includes an energy management mechanism connecting the ratchet wheel to the spool and which is adapted to yield in response to occupant loading exerted on the belt when ratchet wheel is locked against rotation, and a mode shifting mechanism which is normally operable in a non-activated mode to permit operation of the emergency locking mechanism. The mode shifting mechanism is automatically shifted into a lock-out mode in response to the belt being wound on the spool when the loading exerted by the belt on the energy management mechanism causes it to yield in excess of a maximum allowable limit for locking the ratchet wheel against rotation to prevent payout of the belt.

BRIEF DESCRIPTION OF THE DRAWINGS

The present invention will become more fully understood from analysis of the following detailed description and the accompanying drawings wherein.

DETAILED DESCRIPTION OF THE PREFERRED EMBODIMENT

Figure 1:
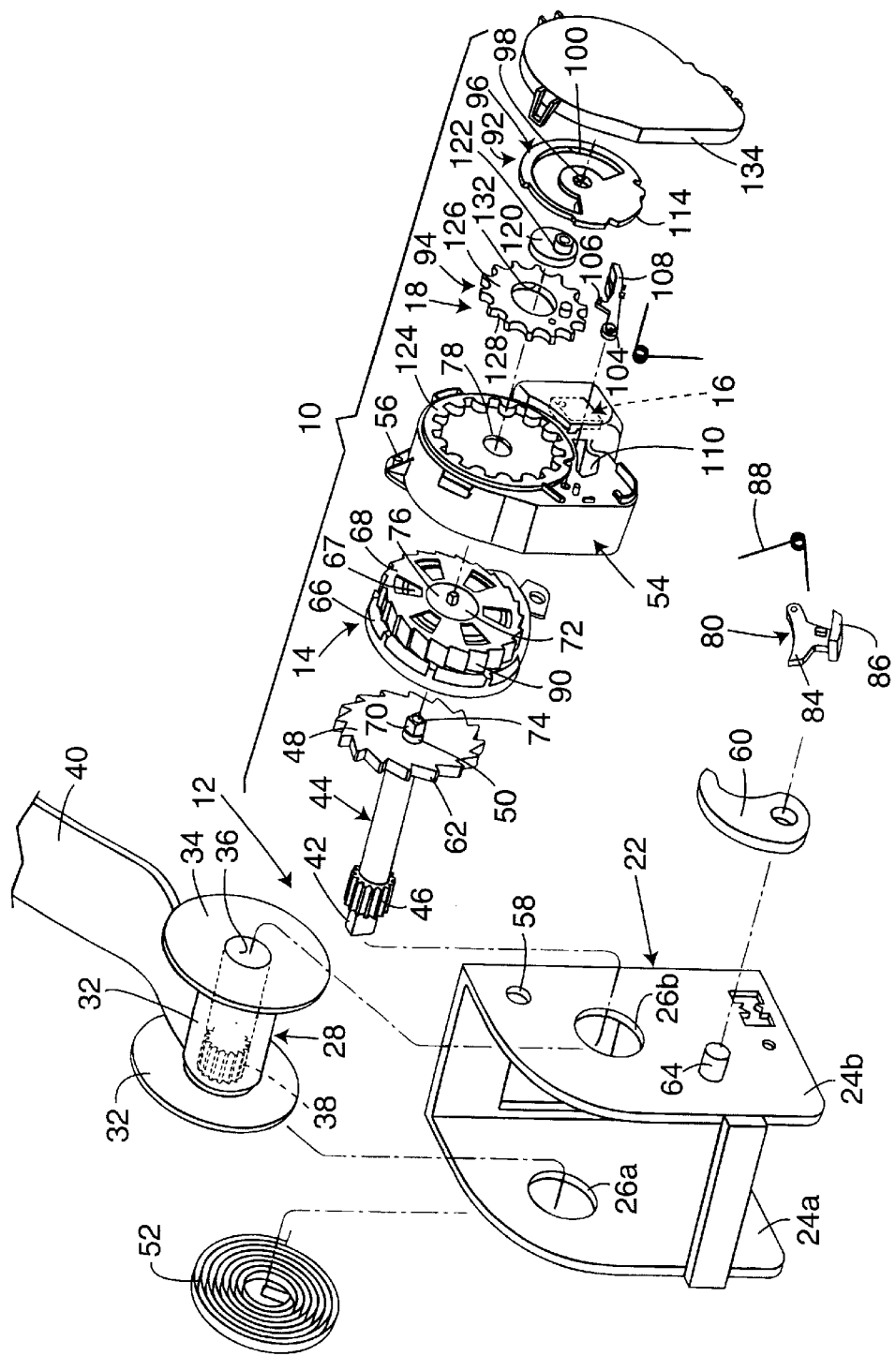
FIG. 1 is an exploded perspective view of a safety belt retractor according to the present invention.

Referring to the drawings, a safety belt retractor 10 is shown which is adapted for use with a safety belt restraint system of the type typically used in motor vehicles. As will be detailed, retractor 10 includes an energy management mechanism 12 that is operable for transferring a portion of the impact energy exerted by the seat occupant on the safety belt during a vehicular collision to a yieldable structure for effectively absorbing (i.e., damping) a portion of the reaction loads exerted on the seat occupant. Retractor 10 also includes a belt-sensitive emergency locking mechanism 14 and a vehicle-sensitive emergency locking mechanism 16, both of known variety and which function to prevent payout of the safety belt when a belt or vehicle acceleration/deceleration condition exceeds predetermined levels. Finally, retractor 10 includes an automatic locking mechanism 18 which can be selectively activated to prevent payout of the safety belt, regardless of the existence or severity of an acceleration condition, for use, for example, in securing a portable child seat to the vehicle seat. As such, automatic locking mechanism 18 functions to permit operation of retractor 10 in either of an ELR mode or an ALR mode. According to the present invention, automatic locking mechanism 18 is further operable to establish a lock-out mode for preventing payout of the safety belt from its stowed position when the total amount of energy absorbed by energy management mechanism 12 exceeds a maximum allowable limit, thereby disabling retractor 10 and providing an indication that retractor 10 should be replaced.

As best seen from FIG. 1, retractor 10 includes a frame 22 which is adapted to be anchored to suitable frame structure of the seat assembly or the vehicle and which has a pair of laterally-spaced walls 24A and 24B with corresponding apertures 26A and 26B formed therein. Retractor 10 also includes a spool 28 having a tubular shaft segment 30 and a pair of disc-shaped end plates or flanges 32 and 34 which are fixed to opposite ends of the spool 28. A throughbore 36 is formed through shaft segment 30 and end plates 32 and 34 of spool 28 and includes internal splines 38 which are formed adjacent to end plate 32. As can be appreciated, the spool can be of a multi-part construction or of unitary construction such as being made as a one-piece aluminum part. As seen, one end of a safety belt 40 is secured to shaft segment 30 of spool 28 in a known manner. While not shown, the other end of safety belt 40 is anchored in a conventional fashion to form a well-known three-point safety belt system using a tongue plate slidably mounted thereon that is releasably latched to a belt buckle for securing a person or a portable child seat to the vehicle seat.

To rotatably mount spool 28 to frame 22, a first end segment 42 of a torsion bar 44 is routed through aperture 26 in wall 24B, throughbore 36 in spool 28, and aperture 24A in wall 24B such that its external splines 46 mesh with internal splines 38. Thus, torsion bar 44 is fixed for rotation with spool 28. A ratchet lock wheel 48 is fixed adjacent to a second end segment 50 of torsion bar 44. In addition, a rewind spring 52 is provided adjacent to an outer surface of wall 24A and has its center fixed to first end segment 42 of torsion bar 44 or end plate 32 and has its outer end fixed to frame 22. Rewind spring 52 functions to normally bias spool 28 for rotation in a first or belt-rewind (i.e., clockwise in the drawings) direction and to exert a retractive force on belt 40 which assists in winding belt 40 onto spool 28.

With continued reference to FIG. 1, retractor 10 is shown to include a housing 54 which is adapted to be secured to wall 24B of frame 22 such as by posts 56 snapped into apertures 58. Housing 54 defines an enclosed space with wall 24B within which belt-sensitive emergency locking mechanism 14 and vehicle-sensitive emergency locking mechanism 16 are located. Vehicle-sensitive emergency locking mechanism 16 is conventional and is operably associated with ratchet wheel 48 for causing movement of a first lock pawl 60 between a first position displaced from teeth 62 of ratchet wheel 48 and a second position engaging teeth 62 on ratchet wheel 48. First lock pawl 60 is pivotably supported on a post 64 extending from wall 24B of frame 22 and is normally biased to its first position. When first lock pawl 60 is in its first position, bi-directional rotation of spool 28 is permitted so as to define a released mode for belt-sensitive emergency locking mechanism 14. Belt-sensitive emergency locking mechanism 14 is also operable to move first lock pawl 60 to its second position when the acceleration of spool 28, caused by rapid extension of belt 40, exceeds a predetermined acceleration value. When first lock pawl 60 is its second position, spool 28 is prevented from rotating in a second or belt-unwind (i.e. counter-clockwise in the drawings) direction, thereby preventing payout of safety belt 40. However, spool 28 can still be rotated in its belt-rewind direction. As such, movement of first lock pawl 60 to its second position defines a locked mode for belt-sensitive emergency locking mechanism 14. While the particular structure of belt-sensitive emergency locking mechanism 14 is not critical to the present invention, it is shown to include a lock ring or cup 66, an inertia ring 67 or ratchet wheel 68. A post 70 extending axially from second end segment 50 of ratchet wheel 48 is adapted to extend through apertures formed in lock ring 66, inertia ring 67, and ratchet wheel 68. A drive ring 72 has a first key (not shown) retained in a keyway aperture 74 formed in post 70. Drive ring 72 also includes a second key 76 which is adapted to pass through an aperture 78 formed in housing 54. When the belt 40 is protracted at a sufficiently fast rate, the inertia ring 67 moves to couple the ratchet wheel 68 to the lock ring 66. Subsequent protraction of the belt 40, that is rotation of the spool 38, causes the lock ring 66 to rotate, thereby moving the first lock pawl 60 into locking engagement with teeth 66 of the ratchet or lock wheel 48. As can be appreciated, other web sensing mechanisms can be substituted for the above.

Vehicle-sensitive emergency locking mechanism 16 is also conventional and includes an inertia mass, shown in phantom, which moves when the vehicle (and retractor 10) is accelerated (positively or negatively) in excess of a predefined acceleration level for moving a second lock or sensor pawl (not shown) from a first position displaced from ratchet teeth 90 on ratchet wheel 68 to a second position engaged with ratchet teeth 90 on ratchet wheel 68. When the second lock pawl is in its first position, bi-directional rotation of spool 28 is permitted to define a released mode for vehicle-sensitive emergency locking mechanism 16. In contrast, movement of the second lock pawl to its second position stops the rotation of the ratchet wheel 68 causing relative motion of the inertia ring 67, coupling the lock ring 66 to the spool 38, which again causes the first lock pawl 60 to engage the teeth 66, locking the retractor to define a locked mode for vehicle-sensitive emergency locking mechanism 16. One such web and vehicle sensitive locking mechanism is shown in EP 0 228 729 A1 which is incorporated herein by reference. Other vehicle-sensitive mechanisms can be substituted for the above.

Automatic locking mechanism 18 is shown to include a third lock pawl 80 is mounted on a pin 82 (see FIG. 2) extending from lock ring 66 for pivotal movement between an unlatched position and a latched position. Third lock pawl 80 includes a latch segment 84 and an actuation segment 86. A first torsion or bias spring 88 acts between third lock pawl 80 and lock ring 66 for normally urging third lock pawl 80 toward its unlatched position. With third lock pawl 80 in its unlatched position, latch segment 84 is displaced from teeth 62 on ratchet or lock wheel 48. As will be hereinafter described, automatic locking mechanism 18 is a mode shifting mechanism which can be selectively activated to move third lock pawl 80 from its unlatched position to its latched position for shifting retractor 10 from operation in an emergency locking retractor (ELR) mode into an automatic locking retractor (ALR) mode. Likewise, the mode shifting mechanism can be de-activated by moving third lock pawl 80 from its latched position to its unlatched position for shifting retractor 10 from its ALR mode into its ELR mode.

To provide means for shifting retractor 10 between its ELR and ALR modes, automatic locking mechanism 18 includes a cam assembly 92 (see FIGS. 1, 2–4) which is operable for selectively moving third lock pawl 80 from its unlatched position to its latched position, in opposition to the biasing of first torsion spring 88, after a predetermined length of belt 40 has been unwound from spool 28. Additionally, cam assembly 92 is also operable to permit first torsion spring 88 to move third lock pawl 80 from its latched position to its unlatched position after the predetermined length of belt 40 has been subsequently rewound onto spool 28. According to the embodiment shown, cam assembly 92 includes a cam wheel 96 having a central aperture 98 and an arcuate lost-motion slot 100, and a cam follower 102 pivotably supported on a post 104 extending from housing 54. Cam follower 102 includes a first leg 106 and a second leg 108 which extends through an opening 110 formed in housing 54. A second torsion spring 112 acts between housing 54 and cam follower 102 for urging first leg 106 into continuous engagement with a portion of the outer peripheral edge of cam wheel 96. In particular, the outer peripheral edge of cam wheel 96 defines a cam surface 114, the contour of which controls whether or not second leg 108 of cam follower 102 engages actuation segment 86 of third lock pawl 80.

Automatic locking mechanism 18 also includes a belt counter or timing assembly 94 which controls actuation of cam assembly 92 based on whether the predetermined length of belt 40 has been withdrawn from or retracted onto spool 28. In particular, timing assembly 94 includes a gerotor-type reduction mechanism which is operable for controlling engagement of first leg 106 of cam follower 102 with cam surface 114 as a function of the length of belt 40 which is wound on spool 28. Timing assembly 94 includes an eccentric ring 120 having a central keyway aperture (not shown) adapted to non-rotatably receive second key 76 of drive ring 72. In addition, and an eccentric journal pin 122 extends outwardly from eccentric ring 120 and is adapted to be supported in central aperture 98 of cam wheel 96. Timing assembly 94 also includes a ring gear 124 integrally formed in housing 54. A stator ring 126 has external gear teeth 128 which mesh with internal gear teeth 130 of ring gear 124. Stator ring 126 also includes a central aperture 132 within which eccentric ring 120 is journally supported. Since drive ring 72 couples eccentric ring 120 for common rotation with spool 28 and since journal pin 122 is retained in central aperture 98 of cam wheel 96, rotation of spool 28 causes eccentric rotation of eccentric ring 120 which, in turn, causes stator ring 126 to rotate eccentrically about ring gear 124 at a reduced ratio and in an opposite direction relative to spool 28. A cover plate 134 is adapted for attachment to housing 54 to enclose cam assembly 92 and timing assembly 94 therein.

Figure 2:
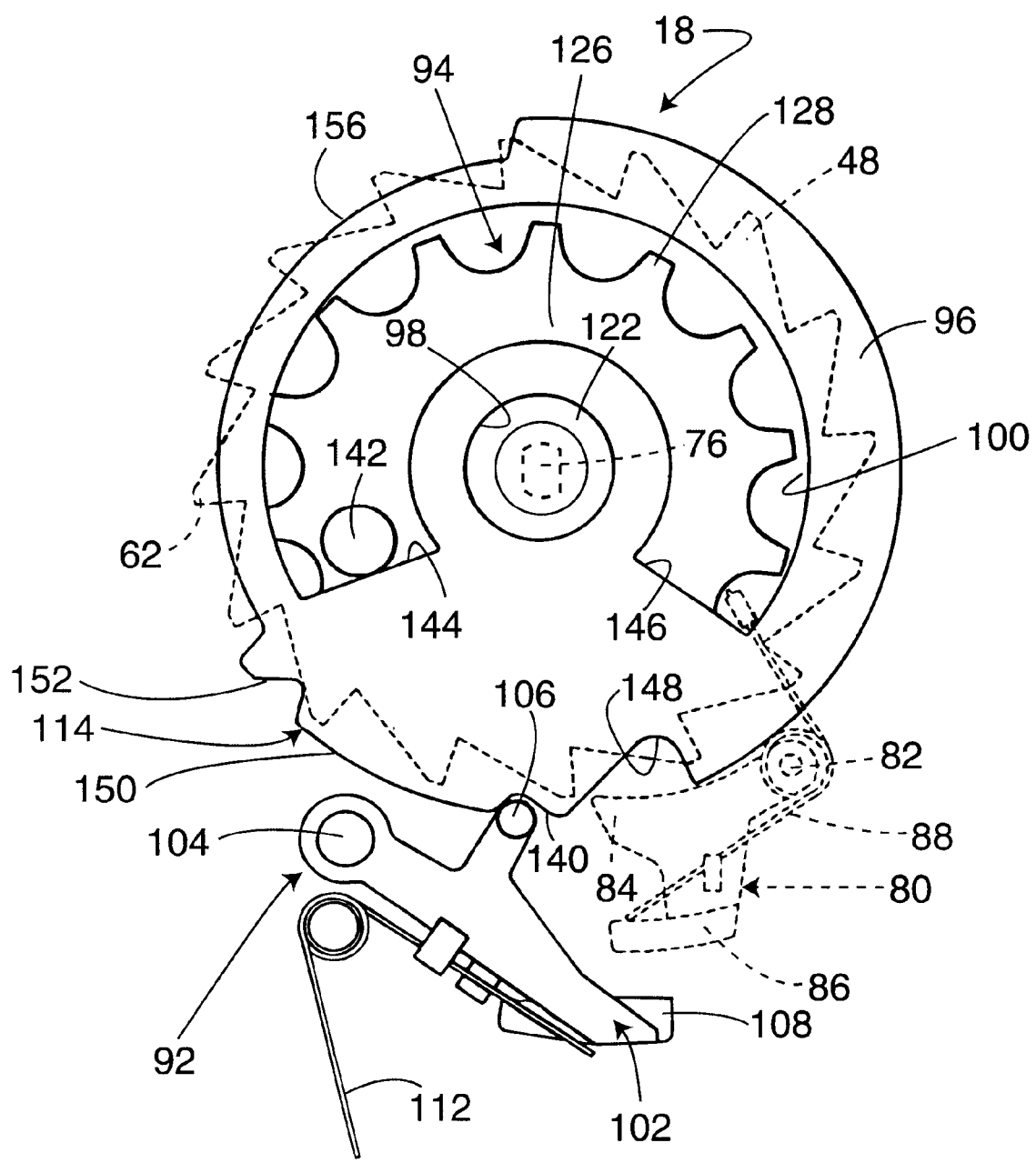
FIGS. 2 through 5 illustrate the position of various components of the safety belt retractor for selectively activating an automatic locking mechanism to shift between an ELR mode and an ALR mode.

With reference to FIGS. 2 through 8, wherein the operational modes available with safety belt retractor 10 will now be described. In particular, FIG. 2 illustrates the position of components associated with cam assembly 92 and timing assembly 94 when automatic locking mechanism 18 is in a non-activated mode and safety belt 40 is fully retracted to its home or stowed position wound on spool 28. In this non-activated mode, retractor 10 operates in its ELR mode such that belt 40 can be freely withdrawn and retracted. As shown, third lock pawl 80 is held by first torsion spring 88 in its unlatched position while first leg 106 of cam follower 102 is biased by second torsion spring 112 into engagement with a first detent 140 formed in cam surface 114 of cam wheel 96. The depth of first detent 140 is selected to maintain second leg 108 of cam follower 102 in a position displaced from actuation segment 86 of third lock pawl 80. In addition, a cam post 142 extending from stator ring 126 is shown positioned in lost-motion slot 100 of cam wheel 96 adjacent to a first terminal end 144 thereof. As safety belt 40 is withdrawn from its stowed position, spool 28 and ratchet wheel 48 are rotated in a counter-clockwise direction which causes stator ring 126 to rotate eccentrically in a clockwise direction and at a reduced rate which, in turn, causes cam post 142 to travel within lost-motion slot 100 away from its first terminal end 144.

Figure 3:
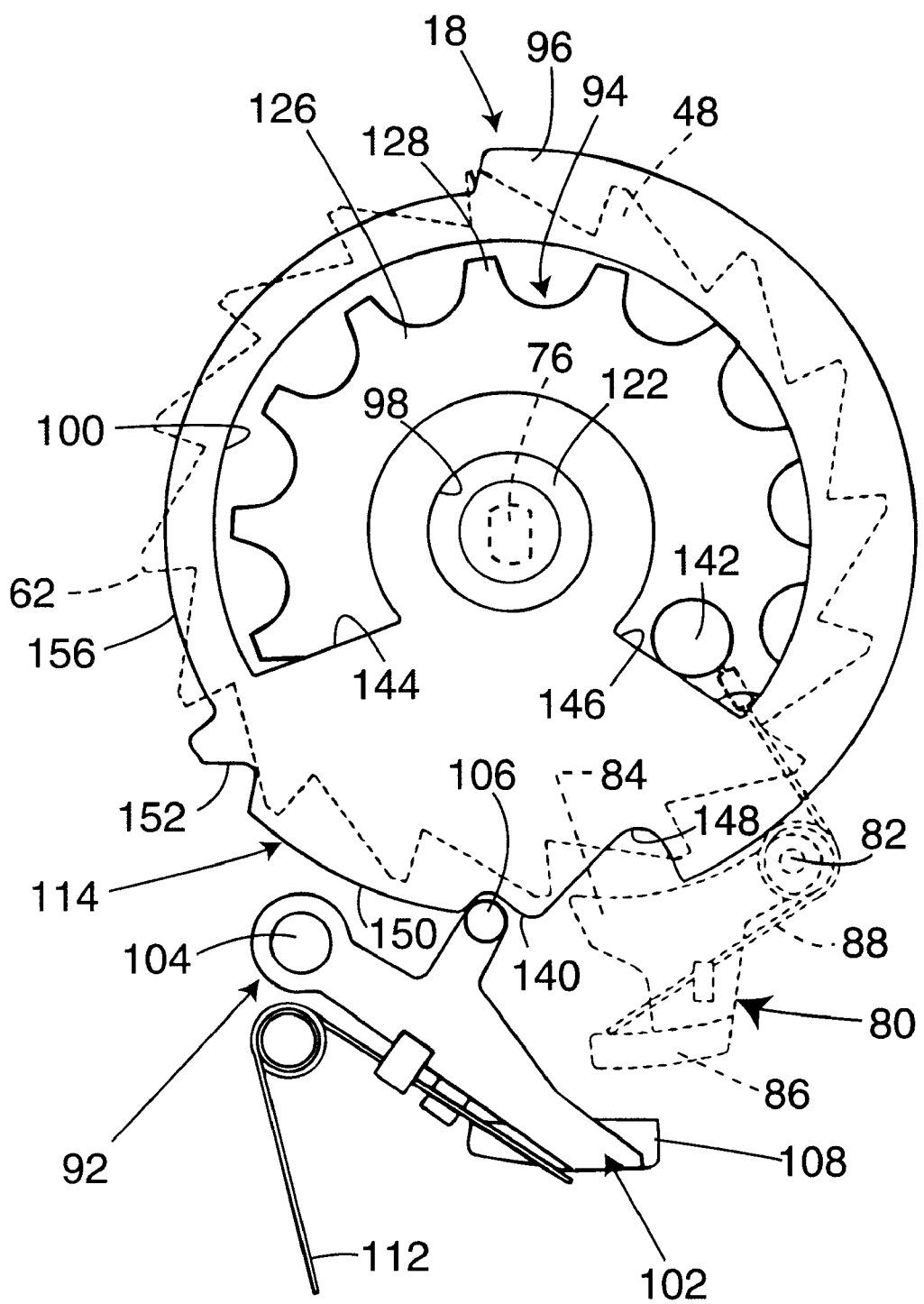

FIG. 3 illustrates the components of cam assembly 92 and timing assembly 94 when automatic locking mechanism 18 is still in its non-activated mode and a length of belt 40 has been withdrawn for locating cam post 142 adjacent to a second terminal end 146 of slot 100 while first leg 106 of cam follower 102 is maintained in engagement with first detent 140. Thus, the length of belt 40 required to rotate spool 28 sufficiently to move cam post 142 between the positions shown in FIGS. 2 and 3 is the maximum length which can be withdrawn from spool 28 to maintain automatic locking mechanism 18 in its non-actvated mode.

Figure 4:
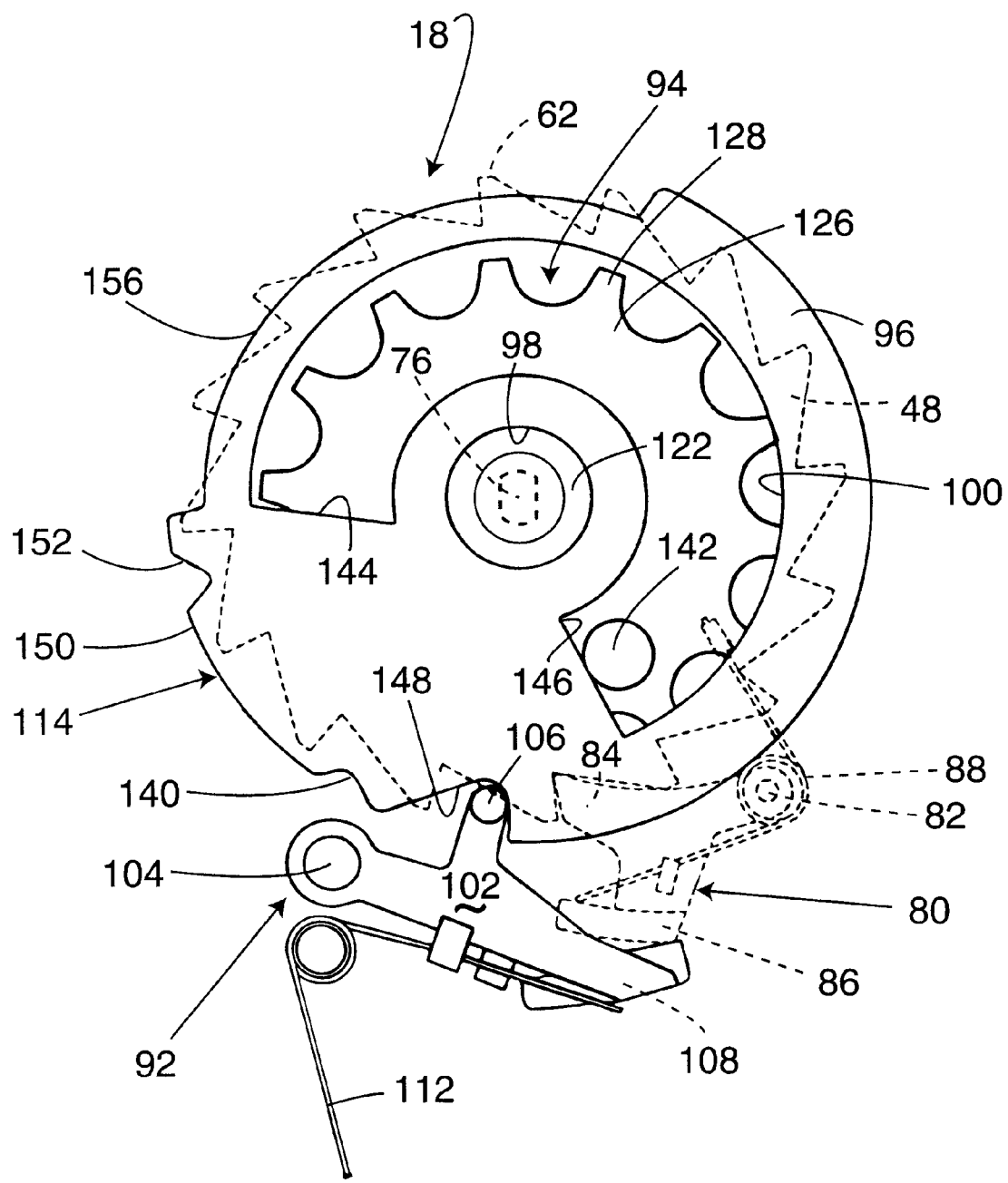

When it is desired to switch retractor 10 into its ALR mode, automatic locking mechanism 18 is shifted into its activated mode by withdrawing a length of belt 40 from retractor 10 which is sufficient to cause cam post 142 to engage second terminal end 146 of lost-motion slot 100 and rotate cam wheel 96 in a clockwise direction to the position shown in FIG. 4. Such rotation of cam wheel 96 causes first leg 106 of cam follower 102 to exit first detent 140 and enter into a lock detent 148 formed in cam surface 114. When first leg 106 of cam follower 102 is biased by second torsion spring 112 into engagement with lock detent 148, its second leg 108 engages actuation segment 86 of third lock pawl 80 so as to forcibly move third lock pawl 80 from its unlatched position to its latched position, in opposition to the biasing of first torsion spring 88, thereby shifting automatic locking mechanism 18 from its non-activated mode into its activated mode. More specifficaly, the above action couples the lock ring 66 to the spool causing, as mentioned above, the lock ring 66 to rotate with the spool in the direction of belt protraction. The motion of the lock ring 66 moves lock pawl 66 into locking engagement with the lock wheel 48. Since the biasing force of second torsion spring 112 is greater than that of first torsion spring 88, cam follower 102 holds third lock pawl 80 in its latched position. As noted, movement of third pawl 80 to its latched position causes latch segment 84 to move into engagement with teeth 62 on ratchet wheel 48 for preventing further payout of belt 40 while permitting subsequent retraction thereof. The length of belt 40 required to rotate spool 28 sufficiently to move cam post 142 from the position shown in FIG. 2 to the position shown in FIG. 4 defines the predetermined length of safety belt 40 which must be withdrawn from spool 28 to shift automatic locking mechanism 18 into its activated mode. As noted, with automatic locking mechanism 18 in its activated mode, retractor 10 operates in its ALR mode.

When it is desired to return retractor 10 to operation in its ELR mode, automatic locking mechanism 18 shifted into its non-activated mode by fully retracting belt 40 to its stowed position. Such retraction of belt 40 causes clockwise rotation of spool 28 and ratchet wheel 48 and corresponding counter-clockwise rotation of stator ring 126. This counter-clockwise rotation of stator ring 126 causes cam post 142 to move in lost-motion slot 100 and engage first terminal end 144 thereof for rotating cam wheel 96 in a counter-clockwise direction toward the position shown in FIG. 2. This rotation of cam wheel 96 causes first leg 106 of cam follower 102 to exit lock detent 148 and enter into engagement with first detent 140, whereby second leg 108 of cam follower 102 is moved to the position displaced from actuation segment 86 of third lock pawl 80. As such, first torsion spring 88 urges third lock pawl 80 to move to its unlatched position, thereby shifting automatic locking mechanism 18 from its activated mode into its non-activated mode.

In accordance with the present invention, automatic locking mechanism 18 is also capable of operation in a lock-out mode for preventing payout of belt 40 from its stowed position once energy management mechanism 12 has absorbed a maximum determinable allowable amount of energy. In the embodiment described, the maximum allowable amount of energy to be absorbed by energy management mechanism 12 for purposes of shifting automatic locking mechanism 18 into its lock-out mode is defined as the maximum allowable amount of torsional yielding of torsion bar 44. Thus, the additional revolution(s) of spool 28 which result from torsional yielding of torsion bar 44 relative to the lock wheel 48 are utilized to shift automatic locking mechanism 18 from its non-activated mode into its lock-out mode in response to retraction of belt 40 to its stowed position following a vehicular collision incident if the torsion bar 44 has been twisted in excess of a predetermined number of turns. In particular, the lock-out feature utilizes the additional rotation (i.e. over-travel) of stator ring 126 caused by winding of the additional length of belt 40 onto spool 28 after a collision to rotate cam wheel 96 to a position whereat first leg 106 of cam follower 102 engages a lock-out portion of cam surface 114 for moving third lock pawl 80 to its latched position.

Figure 5:
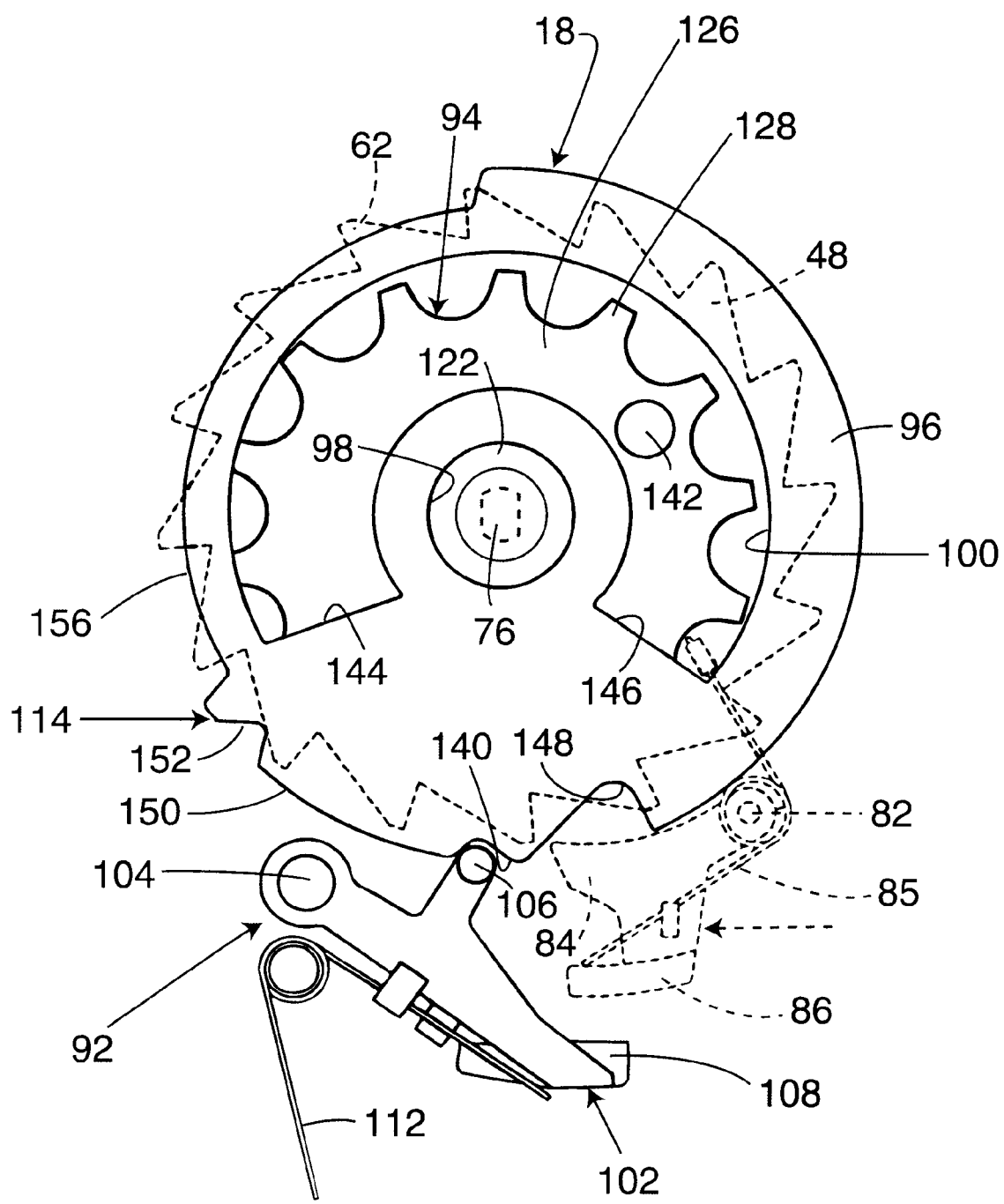

Referring now to FIG. 5 through 8, the lockout feature will be described in greater detail. In particular, FIG. 5 illustrates the position of the components associated with cam assembly 92 and timing assembly 94 when a length of belt 40 has been withdrawn from retractor 10 and is latched across the torso of a seat occupant and automatic locking mechanism 18 is operating in its non-activated mode. Upon the occurrence of a vehicular collision, at least one of emergency locking mechanisms 14 and 16 is actuated and shifted into its locked mode. Due to incorporation of energy management mechanism 12 into retractor 10, loading exerted by the seat occupant on belt 40 during the impact causes spool 28 and first end segment 42 of torsion bar 44 to torsionally yield (i.e. twist) in a counter-clockwise direction relative to ratchet or lock wheel 48 which has been latched against movement. This twisting permits an additional length of belt 40 to be paid-out from retractor 10 in a controlled manner for absorbing a portion of the impact load applied to the seat occupant. Upon release of belt 40 following the collision, retraction of the original length, plus the additional length of belt 40, causes a corresponding amount of additional rotation of stator ring 126 in the counter-clockwise direction. This over-travel of stator ring 126 causes cam post 142 to engage first terminal end 144 of lost-motion slot 100 and forcibly rotate cam wheel 96 in a counter-clockwise direction such that first leg 106 of cam follower 102 exits first detent 140 (see FIG. 6) and rides against a dwell segment 150 of cam surface 114. A second detent 152 (see FIG. 7) is formed at the opposite end of dwell segment 150 which defines the limit of allowable over-travel of stator ring 126. As such, the length of dwell segment 150 between detents 140 and 152 is selected to accommodate a predetermined amount of over-travel of stator ring 126 caused by twisting of torsion bar 44.

Figure 6:
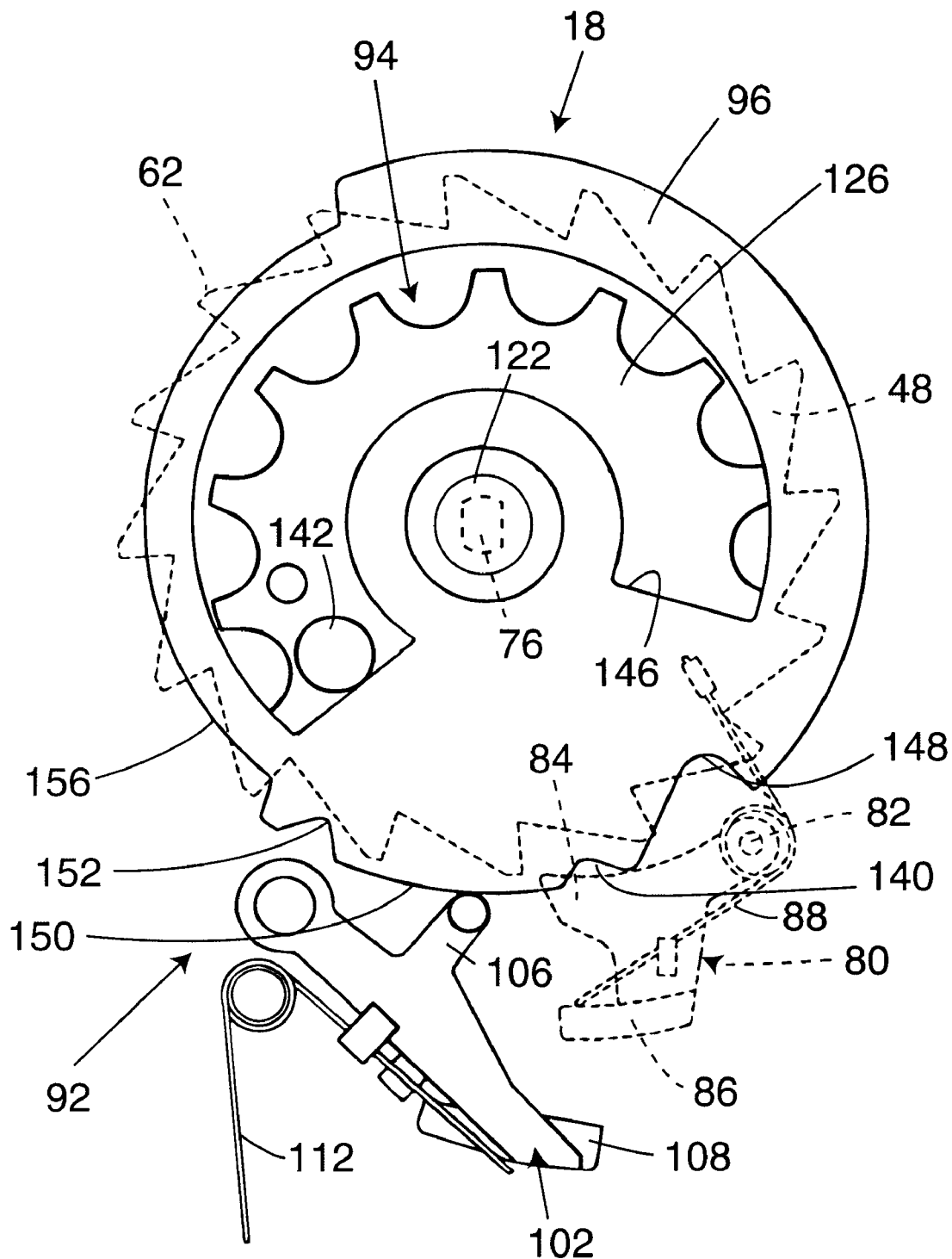
FIGS. 6 through 8 illustrate the position of various components of the safety belt retractor for shifting the automatic locking mechanism into a lock-out mode.
Figure 7:
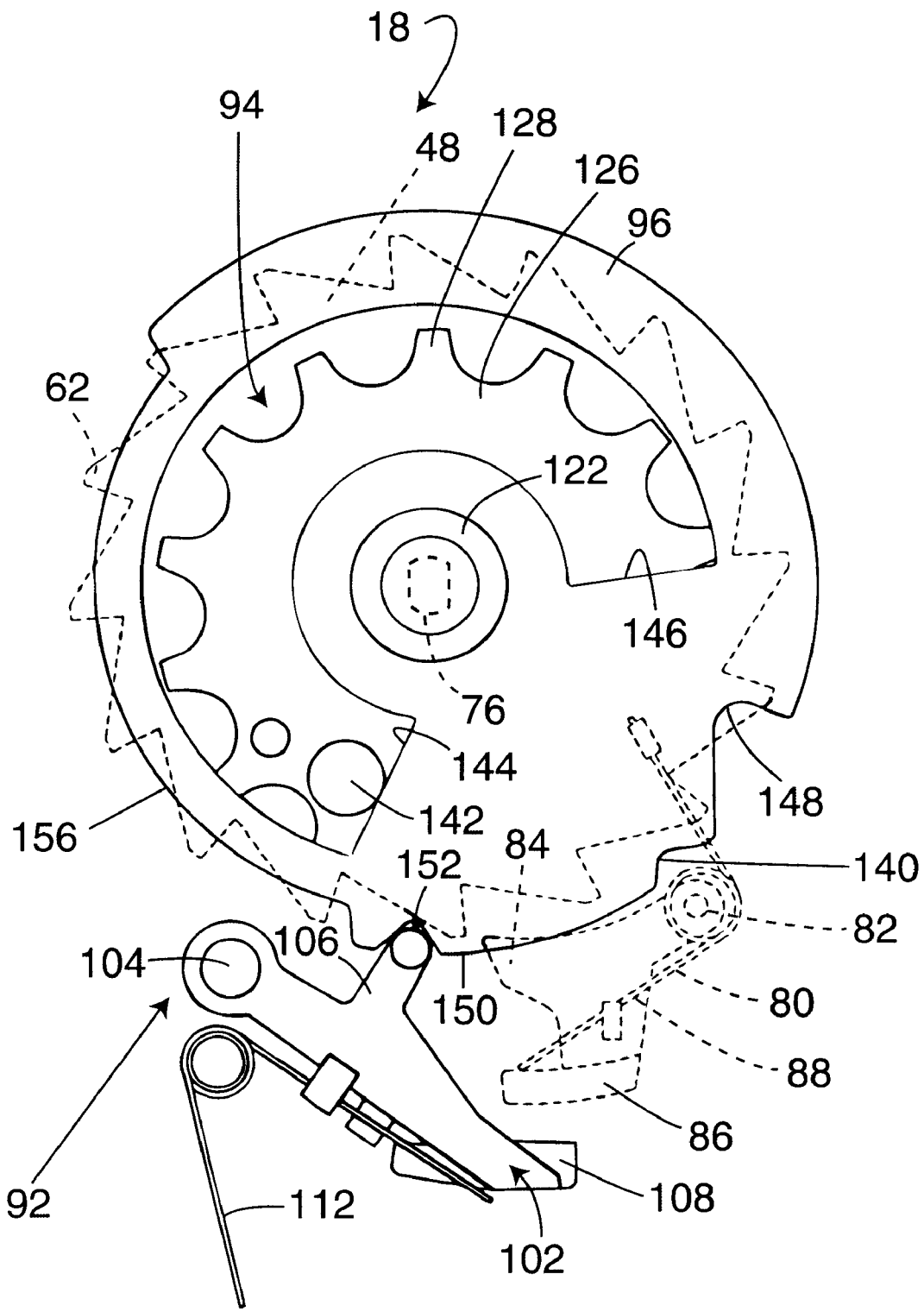

Referring specifically to FIG. 6, first leg 106 of cam follower 102 is shown engaging dwell segment 150 of cam surface 114 resulting from a certain amount of over-travel of stator ring 126 caused by a corresponding amount of twisting of torsion bar 44. In direct comparison, FIG. 7 illustrates first leg 106 of cam follower 102 engaging second detent 152 resulting from to a greater amount of over-travel of stator ring 126 caused by a corresponding greater amount of twisting of torsion bar 44. The over-travel shown in FIG. 7 could be the result of a single severe incident or, alternatively, could be the result of the incident which caused the over-travel shown in FIG. 6 summed with one or more additional incidents which caused additional yielding of torsion bar 44. In either case, the contour of dwell segment 150 and second detent 152 work in conjunction with first detent 140 to maintain cam follower 102 in a position whereat its second leg 108 is displaced from actuation segment 86 of third lock pawl 80 for maintaining third lock pawl 80 in its unlatched position, thereby maintaining automatic locking mechanism 18 in its non-activated mode. Preferably, the location of second detent 152 on cam surface 114 is selected to correspond to the amount of over-travel of stator ring 126 caused by the predetermined number of turns of torsion bar 44 for permitting continued use of retractor 10.

Figure 8:
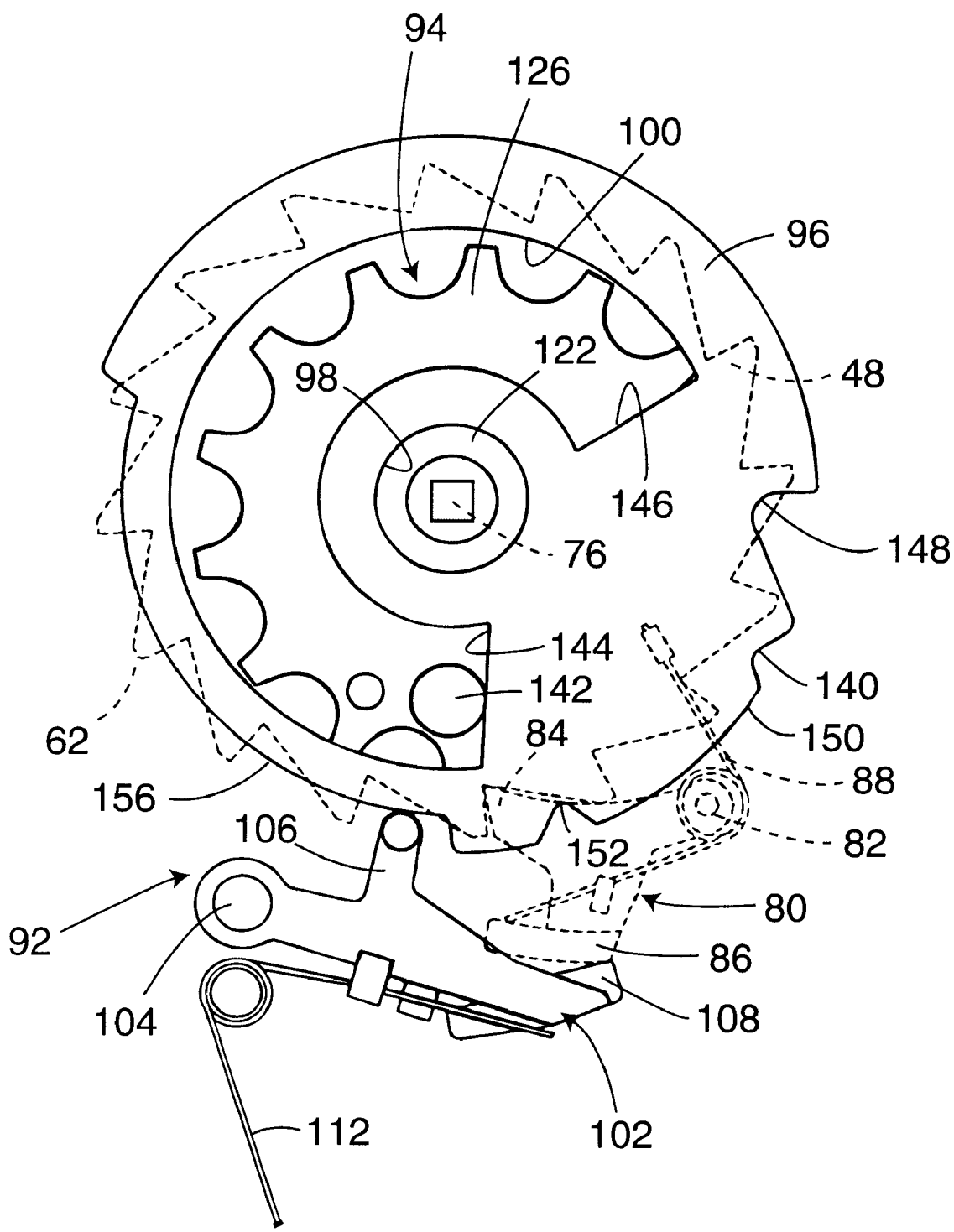

As shown in FIG. 8, cam surface 114 includes an elongated lockout detent 156 which is formed adjacent to second detent 152. The depth of lock-out detent 156 is selected to cause cam follower 102 to pivot to a position whereat its second leg 108 engages actuation segment 86 of third lock pawl 80 and forcibly pivots third lock pawl 80 to its latched position. In operation, when belt 40 is retracted to its stowed position following a collision and the additional length of belt 40 wound onto spool 28 due to yielding of energy management mechanism 12 corresponds to a number of turns of torsion bar 44 which exceeds the predetermined number, then over-travel of stator ring 126 causes cam post 132 to engage first end 144 of lost-motion slot 100 and rotate cam wheel 96 in a counter-clockwise direction for causing first leg 106 of cam follower 102 enter lock-out detent 156. This engagement of first leg 106 of cam follower 102 with lock-out detent 156 acts to shift automatic locking mechanism 18 from its non-activated mode into its lock-out mode which prevents withdrawal of belt 40 from its stowed position, thereby disabling retractor 10, preventing webbing from being extracted and providing an indication that retractor 10 should be replaced. Again, the total energy required to twist torsion bar 44 in excess of its predetermined number of turns can be the result of a single severe accident or the cumulative result of the sum of several less severe accidents. Thus, after the cumulative energy absorbed by retractor 10, as measured the twisting of torsion bar 44, exceeds the predetermined number of turns, belt 40 is permitted to retract to its stowed position but cannot be subsequently withdrawn due to engagement of latch segment 84 of third lock pawl 80 with teeth 62 of ratchet wheel 48. Accordingly, the lockout feature positively locks retractor 10 against further use to provide a clear indication that retractor 10 should be replaced. While the lock-out feature has been described with reference to FIGS. 5 through 8 showing automatic locking mechanism 18 initially operating in its non-activated mode, it is understood that the lock-out feature is also functional when automatic locking mechanism 18 is initially operating in its activated mode.

Figure 9:
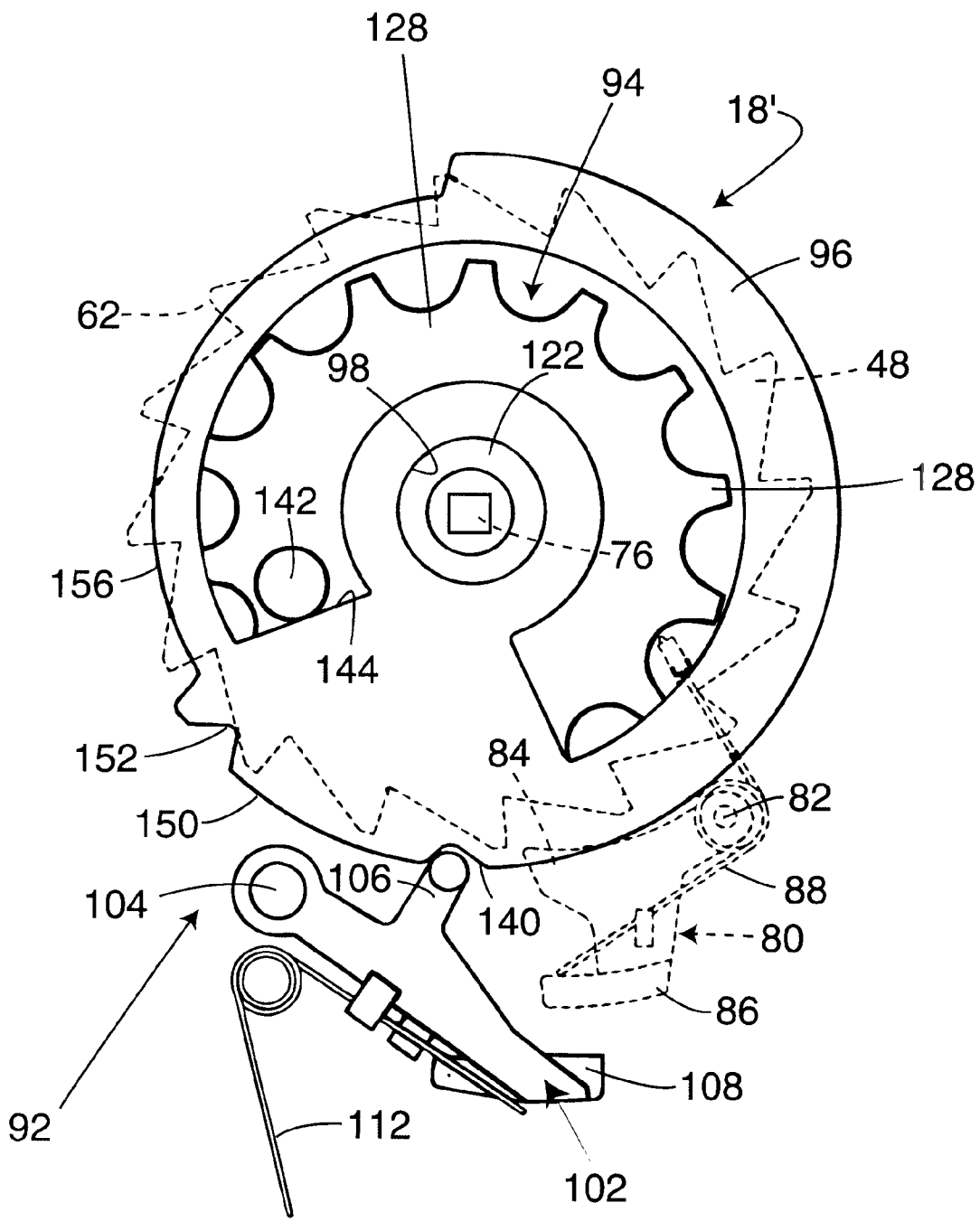
FIG. 9 is a view, similar to FIG. 2, but modified to show the position of the components of an emergency locking retractor for shifting a mode shifting mechanism between an ELR mode and a lockout mode.

Referring now to FIG. 9, the components of a mode shift mechanism 18' are shown to be substantially similar to those of automatic locking mechanism 18, with the exception that lock detent 148 has been eliminated and the arc length of lost-motion slot 100 has been increased. Mode shift mechanism 18' can be installed in safety belt retractor 10 for use in vehicular seating applications where the ALR mode is not required such as, for example, the front driver-side seat. Thus, mode shift mechanism 18' functions to shift retractor 10 from an ELR mode into a lockout mode when the cumulative energy absorbed by energy management mechanism 12 exceeds the maximum allowable limit. Reference can be made to the previous description provided in conjunction with FIGS. 5 through 8 for discussion of the sequence of events required to shift mode shift mechanism 18' from its ELR mode into its lockout mode.

The present invention being thus described, it will be obvious to those skilled in the retractor art that the invention may be varied in many ways. Accordingly, Such variations are not to be regarded as a departure from the spirit and scope of the invention, and all such modifications are intended to be included within the scope of the following claims.

I claim:

1. A safety belt retractor comprising:
    a spool (28);
    a belt (40) wound on the spool (28);
    a ratchet wheel (48);
    an emergency locking mechanism (14) normally operable in a released mode to permit payout of the belt (40) and which is automatically shifted into a locked mode for locking the ratchet wheel (48) against rotation to prevent payout of the belt (40) in response to the occurrence of a predetermined acceleration condition;
    an energy management mechanism (44) connecting the ratchet wheel (48) to the spool (28) and which is adapted to yield in response to loading exerted on the belt (40) when ratchet wheel (28) is locked against rotation; and
    a mode shifting mechanism (18') normally operable in a non-activated mode to permit operation of the emergency locking mechanism (14) and which is automatically shifted into a lock-out mode in response to the belt (40) being wound to a determinable amount on the spool (28) when the loading exerted by the belt (40) on the energy management mechanism (44) has caused the energy management mechanism (44) to yield in excess of a determinable allowable limit for locking the ratchet wheel (48) against rotation to prevent payout of the belt (40).

2. The safety belt retractor of claim 1 wherein the mode shifting mechanism (18') comprises:
    a lock pawl (80) moveable between an unlatched position displaced from engagement with the teeth (62) on ratchet wheel (48) and a latched position engaging the teeth (62) on the ratchet wheel (48);
    a first spring (88) urging the lock pawl (80) toward the unlatched position;
    a cam assembly (92) including a cam member (96) having a cam surface (114), and a cam follower (102) biased by a second spring (112) into engagement with the cam surface (114), the cam surface (114) having a first segment (140, 150, 152) adapted to locate the cam follower (102) in a position displaced from the lock pawl (80) and a second segment (156) adapted to locate the cam follower (102) in a position engaging the lock pawl (80) to move the lock pawl (80) to its latched position; and a timing member (126) driven by the ratchet wheel (48) for moving the cam member (96) in proportion to the amount of yielding of the energy management mechanism (44), whereby movement of the timing member (126) in response to winding of the belt (40) onto the spool (28) to its fully wound position causes the cam member (96) to move for causing the cam follower (102) to move from engagement with the first segment (140,150,152) of cam surface (114) into engagement with the second segment (156) of cam surface (114) when the amount of yielding of energy management mechanism (44) exceeds the maximum allowable limit.

3. The safety belt retractor of claim 2 wherein yielding of the energy management mechanism (44) causes controlled payout of an additional length of the belt (40) due to rotation of the spool (28) in a belt-unwind direction relative to the ratchet wheel (48), and when the additional length of the belt (40) exceeds a predefined length the subsequent rotation of the spool (28) in a belt-wind direction in response to full winding of the belt (40) onto the spool (28) causes timing member (126) to move cam member (96) for causing cam follower (102) to engage the second segment (156) of the cam surface (114), whereby the lock pawl (80) is moved to its latched position preventing rotation of ratchet wheel (48) and spool (28) in the belt-unwind direction to prevent payout of the belt (40).

4. The safety belt retractor of claim 2 wherein the cam member (96) is supported for rotation, and wherein the timing member (126) is rotatably driven by the ratchet wheel (48) and is adapted to engage a second cam surface (144) formed on the cam member (96), whereby yielding of the energy management mechanism (44) results in twisting of the spool (28) relative to the ratchet wheel (48) such that full rewind of the belt (40) onto the spool (28) causes the timing member (126) to engage the second cam surface (144) and rotate the cam member (96).

5. A safety belt retractor comprising:
    a spool (28);
    a belt (40) wound on the spool (28);
    a ratchet wheel (48);
    a torsion bar (44) having a first end (46) fixed to the spool (28) and a second end (50) fixed to the ratchet wheel (48);
    an emergency locking mechanism (14) actuated in response to a high acceleration condition for releasably locking the ratchet wheel (48) against rotation in a first direction, such locking of the ratchet wheel (48) permits torsion bar (44) to twist as a function of the loading exerted by the belt (40) on the spool (28) for causing corresponding rotation of the spool (28) in the first direction relative to the ratchet wheel (48);
    a lock pawl (80) moveable between an unlatched position displaced from the ratchet wheel (48) and a latched position engaging the ratchet wheel (48) to prevent rotation of the ratchet wheel (48) in the first direction;
    a spring (88) urging the lock pawl (80) toward its unlatched position; and
    a mode shifting mechanism (18') operable for determining the amount of rotation of the spool (28) in a second direction when the belt (40) is wound on the spool (28) to its fully retracted position, the mode shifting mechanism (18') is further operable for moving the lock pawl (80) from its unlatched position to its latched position when the amount of additional rotation of the spool (28) caused by twisting of the torsion bar (44) exceeds a maximum allowable limit.

6. The safety belt retractor of claim 5 wherein the mode shifting mechanism (18') comprises:

a cam assembly (92) including a cam member (96) having a cam surface (114), and a cam follower (102) biased by a second spring (112) into engagement with the cam surface (114), the cam surface (114) having a first segment (140, 150, 152) adapted to locate the cam follower (102) in a position displaced from the lock pawl (80) and a second segment (156) adapted to locate the cam follower (102) in a position engaging the lock pawl (80) to move the lock pawl (80) to its latched position; and a timing member (126) driven by the ratchet wheel (48) for moving the cam member (96) in proportion to the amount of yielding of the torsion bar (44), whereby movement of the timing member (126) in response to winding of the belt (40) onto the spool (28) to its fully retracted position causes movement of the cam member (96) which causes the cam follower (102) to move from engagement with the first segment (140, 150, 152) of cam surface (114) into engagement with the second segment (156) of cam surface (114) when the amount of yielding of torsion bar (44) exceeds the maximum allowable limit.

7. The safety belt retractor of claim 6 wherein yielding of the torsion bar (44) causes controlled payout of an additional length of the belt (40) due to rotation of the spool (28) in the first direction relative to the ratchet wheel (48), and when the additional length of the belt (40) exceeds a predefined length the subsequent rotation of the spool (28) in the second direction in response to full winding of the belt (40) onto the spool (28) causes timing member (126) to move cam member (96) for causing cam follower (102) to engage the second segment (156) of the cam surface (114), whereby the lock pawl (80) is moved to its latched position preventing rotation of ratchet wheel (48) and spool (28) in the first direction to prevent payout of the belt (40).

8. The safety belt retractor of claim 6 wherein the cam member (96) is supported for rotation, and wherein the timing member (126) is rotatably driven by the ratchet wheel (48) and is adapted to engage a second cam surface (144) formed on the cam member (96), whereby yielding of the torsion bar (44) results in rotation of the spool (28) relative to the ratchet wheel (48) such that full rewind of the belt (40) onto the spool (28) causes the timing member (126) to engage the second cam surface (144) and rotate the cam member (96).

9. A safety belt retractor comprising:

a spool (28);

a belt (40) wound on the spool (28);

a ratchet wheel (48);

an energy management mechanism (44) connecting the ratchet wheel (48) to the spool (28) and which is adapted to yield in response to loading exerted on the belt (40) when ratchet wheel (48) is locked against rotation;

an emergency locking mechanism (14) normally operable in a released mode to permit payout of the belt (40) and which is automatically shifted into a locked mode to lock the ratchet wheel (48) against rotation to prevent payout of the belt (40) in response to the occurrence of a predetermined acceleration condition; and a mode shifting mechanism (18) normally operable in a non-activated mode to permit operation of the emergency locking mechanism (14) and which can be selectively shifted into an activated mode for locking the ratchet wheel (48) against rotation to prevent payout of the belt (40) in response to a predetermined length of the belt (40) being unwound from the spool (28), the mode shifting mechanism (18) is shifted from its activated mode into its non-activated mode for releasing the ratchet wheel (48) in response to the predetermined length of the belt (40) being subsequently wound on the spool (28), and wherein the mode shifting mechanism (18) is automatically shifted into a lock-out mode in response to the belt (40) being fully wound on the spool (28) following an impact incident when the loading exerted by the belt (40) on the energy management mechanism (44) causes the energy management mechanism (44) to yield in excess of a maximum allowable limit for locking the ratchet wheel (48) against rotation to prevent payout of the belt (40).

10. The safety belt retractor of claim 9 wherein the mode shifting mechanism (18) comprises:

a lock pawl (80) moveable between an unlatched position displaced from engagement with the ratchet wheel (48) and a latched position engaging the ratchet wheel (48);

a first spring (88) urging the lock pawl (80) toward the unlatched position;

a cam assembly (92) including a cam member (96) having a first cam surface (150) and a second cam surface (156), and a cam follower (102) biased by a second spring (112) into engagement with one of the cam surfaces (150 and 156), the first cam surface (150) is adapted to locate the cam follower (102) in a position displaced from the lock pawl (80) and the second cam surface (156) is adapted to locate the cam follower (102) in a position engaging the lock pawl (80) to move the lock pawl (80) to its latched position; and a timing member (126) driven by the ratchet wheel (48) for moving the cam member (96) in proportion to the amount of yielding of the energy management mechanism (44), whereby movement of the timing member (126) in response to the belt (40) being fully wound onto the spool (28) causes movement of the cam member (96) which causes the cam follower (102) to move from engagement with the first cam surface (150) into engagement with the second cam surface (156) when the amount of yielding of energy management mechanism (44) exceeds the maximum allowable limit.

11. The safety belt retractor of claim 10 wherein yielding of the energy management mechanism (44) causes controlled payout of an additional length of the belt (40) due to rotation of the spool (28) in a belt-unwind direction relative to the ratchet wheel (48), and when the additional length of the belt (40) exceeds a predefined length subsequent rotation of the spool (40) in a belt-unwind direction in response to full winding of the belt (40) onto the spool (28) causes timing member (126) to move the cam member (96) for causing the cam follower (102) to engage the second cam surface (156), whereby the lock pawl (80) is moved to its latched position for preventing rotation of the ratchet wheel (48) and the spool (28) in the belt-unwind direction to prevent payout of the belt (40).

12. The safety belt retractor of claim 10 wherein the cam member (96) is supported for rotation, and wherein the timing member (126) is rotatably driven by the ratchet wheel (48) and is retained in a slot (100) formed in the cam member (96), whereby yielding of the energy management mechanism (44) results in rotation of the spool (28) relative to the ratchet wheel (48) such that full rewind of the belt (40) onto the spool (28) causes the timing member (126) to engage an end surface (144) of the slot (100) and rotate the cam member (96).

13. The safety belt retractor of claim 12 wherein the mode shifting mechanism (18) is shifted from its non-activated mode into its activated mode by withdrawal of the predetermined length of the belt (40) which causes the timing member (126) to engage a second end (146) of the slot (100) and rotate the cam member (96) such that the cam follower (102) moves from engagement with a detent (140) formed in the first cam surface (150) into engagement with a third cam surface (148) for causing movement of the lock pawl (80) to its latched position.

14. The safety belt retractor of claim 13 wherein a second detent (152) is formed in the first cam surface (150) such that the distance between the detents (140 and 152) is selected to accommodate the allowable limit of yielding of the energy management mechanism (44) for maintaining the mode shifting mechanism (18) in its non-activated mode.

15. The safety belt retractor of claim 12 wherein the energy management mechanism (44) is a torsion bar having a first end (42) fixed to the spool (28) and a second end (50) fixed to the ratchet wheel (48).

* * * * *